(12) United States Patent
Kim et al.

(10) Patent No.: US 11,080,649 B2
(45) Date of Patent: Aug. 3, 2021

(54) REMOTE ACCESS MONITORING

(71) Applicant: Amazon Technologies, Inc., Seattle, WA (US)

(72) Inventors: Unyoung Kim, San Carlos, CA (US); David T. Chiu, Palo Alto, CA (US); Michael Crane, Pleasant Hill, CA (US); Calvin Nguyen, Seattle, WA (US); Rohit Shrivastava, Saratoga, CA (US)

(73) Assignee: Amazon Technologies, Inc., Seattle, WA (US)

( * ) Notice: Subject to any disclaimer, the term of this patent is extended or adjusted under 35 U.S.C. 154(b) by 687 days.

(21) Appl. No.: 15/659,224

(22) Filed: Jul. 25, 2017

(65) Prior Publication Data
US 2019/0034859 A1 Jan. 31, 2019

(51) Int. Cl.
| | | |
|---|---|---|
| *G06Q 10/08* | (2012.01) | |
| *G07C 9/00* | (2020.01) | |
| *G05B 19/042* | (2006.01) | |
| *H04L 12/26* | (2006.01) | |
| *H04W 24/00* | (2009.01) | |

(52) U.S. Cl.
CPC ....... *G06Q 10/087* (2013.01); *G05B 19/0428* (2013.01); *G07C 9/00571* (2013.01); *G07C 9/00896* (2013.01); *H04L 43/08* (2013.01); *G07C 2009/0092* (2013.01); *H04W 24/00* (2013.01)

(58) Field of Classification Search
CPC ............ G06Q 10/083; G06Q 10/0833; G06Q 10/0835; G06Q 10/087; G07C 2009/00928; G07C 9/00571; G07C 9/00174; G07C 5/008
See application file for complete search history.

(56) References Cited

U.S. PATENT DOCUMENTS

| | | | |
|---|---|---|---|
| 8,966,615 B2 * | 2/2015 | Cheng | G06F 21/36 726/19 |
| 9,311,767 B2 | 4/2016 | Leung | |
| 9,666,000 B1 | 5/2017 | Schoenfelder et al. | |
| 9,741,010 B1 | 8/2017 | Heinla | |
| 9,892,379 B1 | 2/2018 | Danyluk et al. | |
| 2003/0004814 A1 | 1/2003 | Roseen | |

(Continued)

FOREIGN PATENT DOCUMENTS

WO    WO 2014/151249    9/2014

OTHER PUBLICATIONS

Vivint smart home provides control of your home for a worry-free vacation. (May 24, 2017). Business Wire Retrieved from https://dialog.proquest.com/professional/docview/1901703732?accountid=131444 (Year: 2017).*

(Continued)

*Primary Examiner* — Michael P Harrington
(74) *Attorney, Agent, or Firm* — Knobbe, Martens, Olson & Bear, LLP

(57) ABSTRACT

Features are disclosed for controlling monitoring devices during unattended delivery of an item. The systems and methods described ensure the monitoring devices are monitoring a delivery location at a specified level before granting unattended access to the delivery location. Access may also be conditioned on user specified "do not disturb" rules indicating when remote access is authorized.

23 Claims, 6 Drawing Sheets

(56) References Cited

U.S. PATENT DOCUMENTS

| | | |
|---|---|---|
| 2007/0193834 A1 | 8/2007 | Pai |
| 2007/0247277 A1 | 10/2007 | Murchison et al. |
| 2011/0074570 A1 | 3/2011 | Feldstein et al. |
| 2015/0109104 A1 | 4/2015 | Fadell et al. |
| 2015/0145643 A1 | 5/2015 | Fadell et al. |
| 2015/0156030 A1 | 6/2015 | Fadell et al. |
| 2015/0235173 A1* | 8/2015 | Hall .................. G07C 9/00896 705/339 |
| 2015/0310381 A1* | 10/2015 | Lyman ................ G06Q 10/083 705/330 |
| 2016/0104098 A1 | 4/2016 | Matula et al. |
| 2016/0247344 A1* | 8/2016 | Eichenblatt .......... A47G 29/141 |
| 2016/0307380 A1 | 10/2016 | Ho et al. |
| 2017/0220872 A1* | 8/2017 | Child ................. G06K 9/00771 |
| 2017/0293883 A1* | 10/2017 | Li ........................ H04L 51/046 |
| 2017/0355076 A1 | 12/2017 | Gordon-Carroll |
| 2018/0165637 A1* | 6/2018 | Romero ............. G06Q 10/0833 |

OTHER PUBLICATIONS

VuPoint solutions brings convenience and safety to your doorstep with high-performance, user-friendly smart home security line. (Jan. 5, 2017). Internet Wire Retrieved from https://dialog.proquest.eom/professional/docview/1856772282?accountid=131444 (Year: 2017).*

International Search Report for International Application No. PCT/US2018/042277 dated Oct. 18, 2018.

International Search Report for International Application No. PCT/US2018/042305 dated Oct. 16, 2018.

* cited by examiner

REMOTE ACCESS MONITORING

BACKGROUND

Item deliveries often require the presence of a person to receive the item. If no one is available to receive the item, subsequent attempts may be made to deliver the item. Alternatively, the item may be left at or near the physical delivery location. In this case, the item may be damaged such as by weather or wildlife. The item may be stolen as it waits for the intended recipient. Thus, leaving an item unattended in an unsecured location can result in inefficiencies.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
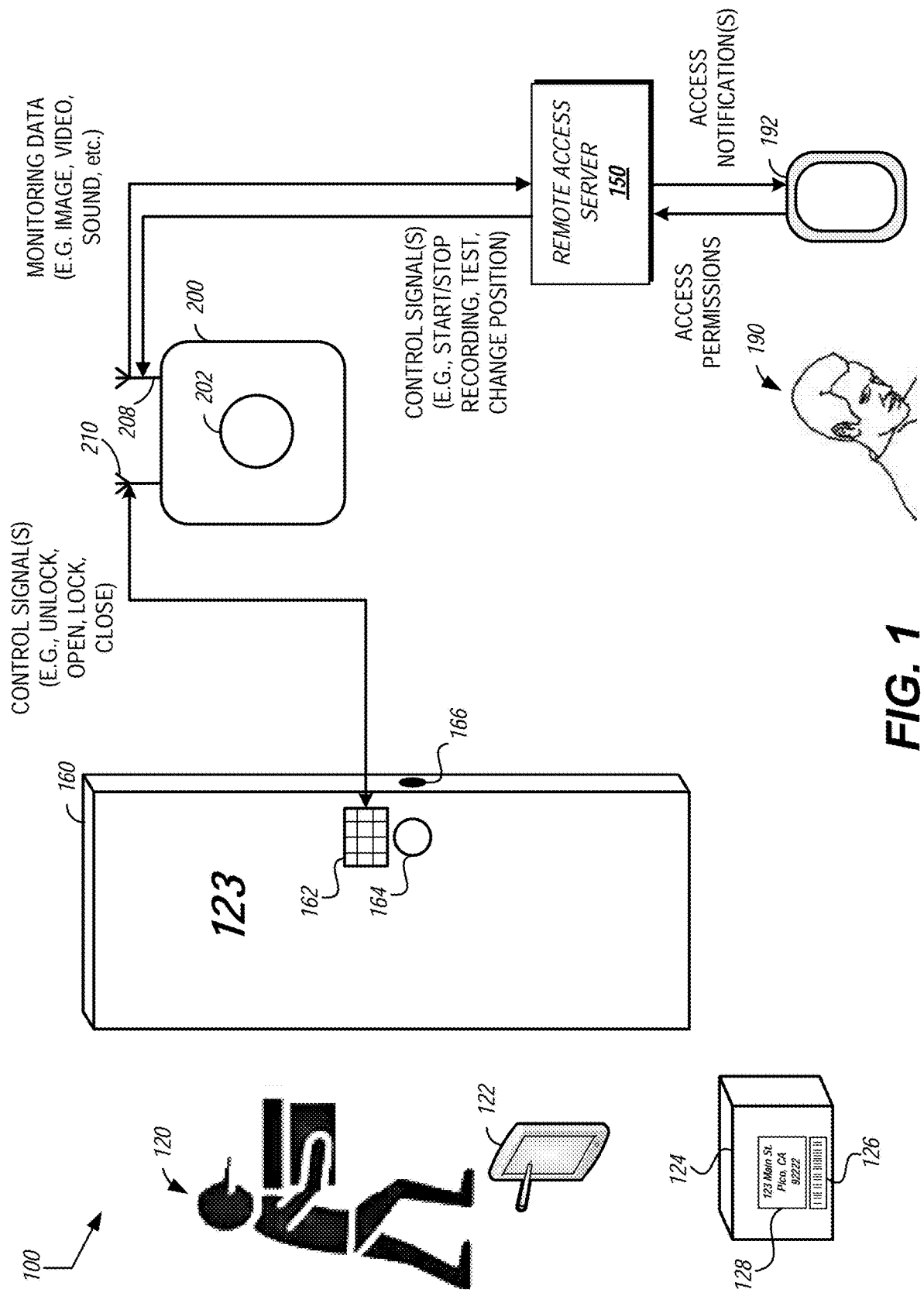
FIG. 1 is a block diagram showing an example environment including a remote access service.

Another solution for unattended item delivery may be to allow access to the delivery location, but such a solution requires a safe, secure, and efficient mechanism for ensuring only authorized parties are granted access.

Described are features for an unattended delivery to provide remote access with secure authentication and authorization. The solution ensures delivery integrity by verifying, in real-time, that the expected item, carried by an expected agent, is located at an expected location, with expected monitoring, before granting access to the delivery location.

For example, a delivery agent may arrive at a delivery location. The delivery agent may scan the item using a delivery device. A remote access system may confirm the delivery agent's proximity to the delivery location. For example, the proximity may be confirmed by a unique identifier transmitted using a personal area network of limited range such as a BLUETOOTH® 4.0 Low Energy communication. The unique identifier may be transmitted to the delivery device by a monitoring device at the delivery location such as a camera. This unique identifier may be transmitted from the delivery device to a remote access server to confirm the proximity of the delivery device. The identifier may be transmitted using a wide area network such as a cellular network or an Internet connection.

After confirming the proximity, the delivery device may present an interface including an instruction to knock or ring the bell at the delivery location. If the recipient is at the delivery location, a face-to-face delivery may be achieved. If the recipient is not at the delivery location, in the prior systems as discussed above, the delivery agent may forego delivery or leave the package, unattended and unsecured, at the delivery location. In the innovative embodiments described, another option is available. The delivery agent may activate a control element (e.g., button) on an interface presented via the delivery device. The control element may cause the delivery device to transmit a request to unlock the delivery location. This request may be transmitted to the remote access server via the wide area network (e.g., a cellular network).

The remote access server may validate the request to confirm, for example, that the item corresponds to the delivery location. If the item is at the correct location, the remote access server may transmit a control message to cause the monitoring device to start collecting data (e.g., recording). The control message may be transmitted to the monitoring device via a wide area network. In some implementations, the monitoring device may be connected to a home WI-FI® network or other IEEE 802.11 standards based wireless network, which in turn is connected to the wide area network.

After receiving a message confirming the monitoring device has changed state (e.g., started recording), the remote access system may transmit a control message to cause a lock or other security device to unlock, disengage, or otherwise release thereby permitting access to the delivery location. The control message may be transmitted to the monitoring device via the wide area network. The monitoring device may, in turn, transmit the unlock command or release command to the lock. The unlock command may be transmitted via a local area network, such as a ZIGBEE™ or Z-WAVE® network, to unlock the door.

The delivery agent may then place the item inside the delivery location (e.g., home, office, delivery bin, locker, shed, etc.). The monitoring device may be configured to capture data of the agent as she is entering the location, placing the item, and exiting the location. Once the item is placed, the delivery agent may activate a control element on the interface of the delivery device that causes the delivery device to transmit a request to secure the delivery location. This request may be transmitted to the remote access server via the wide area network.

The remote access server may transmit a lock command to secure the delivery location. In some implementations, the lock command may be transmitted to the monitoring device via a wide area network. In such implementations, the monitoring device may transmit the lock command to the lock via the local area network (e.g., Z-WAVE®, ZIG-BEE™, or other network based on the IEEE 802.15.4 standard) to secure the delivery location. After confirming that the delivery location is secure (e.g., the door is in a locked status), the remote access server may transmit a control command to the monitoring device to via the wide area network to stop monitoring.

In some implementations, the remote access server may transmit notification messages to a communication device associated with a recipient to indicate the delivery status. For example, a message may be transmitted denoting the item was delivered with a link to watch a video clip of the delivery.

By requiring that a delivery agent scans a package to gain entry, in conjunction with the confirmation of delivery location for the item and proximity to the delivery location, unattended access to a secured location can be safely provided. In some implementations, a time element may be applied to control when remote access may be granted (e.g., delivery must be between 2:00 and 4:00). Such timing constraints may be applied by the remote access server in assessing whether to issue the unlock command. A recipient may specify specific times for delivery or designate "do not disturb/enter" times. The preferences may be for the delivery location, for a specific item, or for time duration (e.g., on vacation). If a request to unlock is received during such times or for an item associated with such times, the system may deny access.

FIG. 1 is a block diagram showing an example environment including a remote access service. The environment 100 may include a delivery device 122. The delivery device 122 may be an electronic communication device configured to transmit machine readable messages via multiple wireless communication protocols. Non-limiting examples of the delivery device 122 include a personal computing device, laptop computing device, hand held computing device, mobile device (e.g., mobile phones or tablet computing devices), wearable device configured with network access and program execution capabilities (e.g., "smart eyewear" or "smart watches"), wireless device, electronic reader, or some other portable electronic device or appliance. The messages may be formatted according to a standardized protocol such as TCP/IP, HTTP, FTP, or the like. The transmission may be sent via wireless or hybrid wired-wireless networks.

A delivery agent 120 may interact with one or more interfaces presented via the delivery device 122. The interfaces may include control elements to receive input or adjust a function of the delivery device 122. For example, the delivery device 122 may include a camera or other optical scanning element. The delivery device 122 may activate the camera to scan an item 124 to be delivered. The item 124 may include a label 128 identifying a recipient 190 of the item 124 or a delivery location associated therewith. The item 124 may include a scannable code 126.

In some implementations, the scannable code 126 may be a machine-readable code, e.g., optical code, one dimensional (1D) bar code, two dimensional (2D) bar code, recognizable text characters, or an image. In the case of a 2D bar code (also referred to as a "matrix code"), the scannable code 126 may be a QR® or "quick response" code, an EZCode® bar code, a PDF417 or "portable data file" bar code, a high capacity color bar code, etc. The scannable code 126 may be scanned using optical techniques such as image scanning or infrared scanning. The scannable code may be transmitted using wireless techniques such as near field communication, radio frequency identification tags, BLUETOOTH®, or other standardized or proprietary wireless messaging technology. The scannable code 126 may be affixed or otherwise associated with the item such that the item can be tracked from the supplier, transportation, fulfillment center, and ultimate end user. The scannable code 126 may encode or indicate an identifier for the item or delivery information related to the item such as address, unique identifier of a monitoring device 200, or other information used in identifying or delivering the item 124.

The monitoring device 200 may be implemented as a camera or other data collection device. The monitoring device 200 may be placed to monitor a delivery location. In some implementations, the monitoring device 200 may be place near a door 160. The monitoring device 200 may be placed behind the door 160 or in an area in front of the door 160. The monitoring device 200 preferably collects data to identify entry and exit activity at the delivery location.

The door 160 may include a handle 164. The handle 164 may be manually operated to disengage a locking mechanism 166. Upon disengagement of the locking mechanism 166, the door 160 may open. In some implementations, the door 160 may be an automated door that, upon unlocking, opens using a mechanical opening system. The door 160 may include a keyless lock controller 162 (e.g., a smart lock). The keyless lock controller 162 may be an electronic device that can send and receive wireless signals such as via ZIGBEE™, Z-WAVE®, or other local area network protocols. The keyless lock controller 162 may receive lock or unlock command messages. These messages may cause the keyless lock controller 162 to engage or disengage the lock 166 without using the handle 164. In some implementations, the keyless lock controller 162 may include a key pad or other input element to receive an entry code to control the lock 166.

The keyless lock controller 162 may receive control signals from the monitoring device 200. The monitoring device 200 may include a first wireless transceiver 210 for communications via local area network protocols. The monitoring device 200 may include a second wireless transceiver 208 for communications via a wide area network (e.g., the Internet or a cellular network) either directly or via a router (not shown). The first wireless transceiver 210 and the second wireless transceiver 208 may be commonly implemented in a multiband transceiver selectively configured to communicate via different wireless protocols. The monitoring device 200 may also transmit wireless signals using a personal area network protocol such as a BLUETOOTH® Low Energy 4.0 standard based protocol. These signals may be broadcasted to a predetermined area such as near the door 160. In this way, information included in the broadcast signals may be used to verify proximity of a device to the monitoring device 200 and, by association, the delivery location.

The monitoring device 200 may transmit monitoring data such as image data, video data, audio data, or the like collected by a sensor 202 the monitoring device 200. The monitoring data may be transmitted via the second wireless transceiver 208, via the wide area network, to the remote access server 150. The remote access server 150 may store the monitoring data in a data store.

As used herein a "data store" may be embodied in hard disk drives, solid state memories and/or any other type of non-transitory computer-readable storage medium accessible to or by a device such as an access device, server, or other computing device described. A data store may also or alternatively be distributed or partitioned across multiple local and/or remote storage devices as is known in the art without departing from the scope of the present disclosure. In yet other embodiments, a data store may include or be embodied in a data storage web service.

The remote access server 150 may transmit control messages to the monitoring device 200. For example, the remote access server 150 may transmit a message causing the monitoring device 200 to begin collecting monitoring data. In some implementations, the monitoring device 200 may transmit one or more acknowledgement messages to the remote access server 150 indicating a response to or result of a control message. In some implementations, the acknowledgement may be included in a message with monitoring data.

The remote access server 150 may transmit access notification messages to an access device 192 associated with the recipient 190. The access device 192 may be an electronic communication device configured to transmit and receive machine readable messages such as email, text messages, messages to activate an application or function of the access device 192, or delivery alerts as described herein. Non-limiting examples of the access device 192 include a personal computing device, laptop computing device, hand held computing device, terminal computing device, mobile device (e.g., mobile phones or tablet computing devices), wearable device configured with network access and program execution capabilities (e.g., "smart eyewear" or "smart watches"), wireless device, electronic reader, media player, home entertainment system, gaming console, set-top box, television configured with network access and program execution capabilities (e.g., "smart TVs"), or some other electronic device or appliance. The messages may be formatted according to a standardized protocol such as TCP/IP, HTTP, FTP, or the like. The transmission may be sent wired, wireless, or hybrid wired-wireless networks.

The access device 192 may present an interface including one or more control elements to receive access permission inputs. The access permission inputs may identify periods of time when access should or should not be granted for a delivery location. The remote access server 150 may receive the access permission inputs and store them in a data store. The access permissions may be accepted if the recipient 190 provides sufficient user credentials (e.g., username, password, biometrics, etc.).

Figure 2:
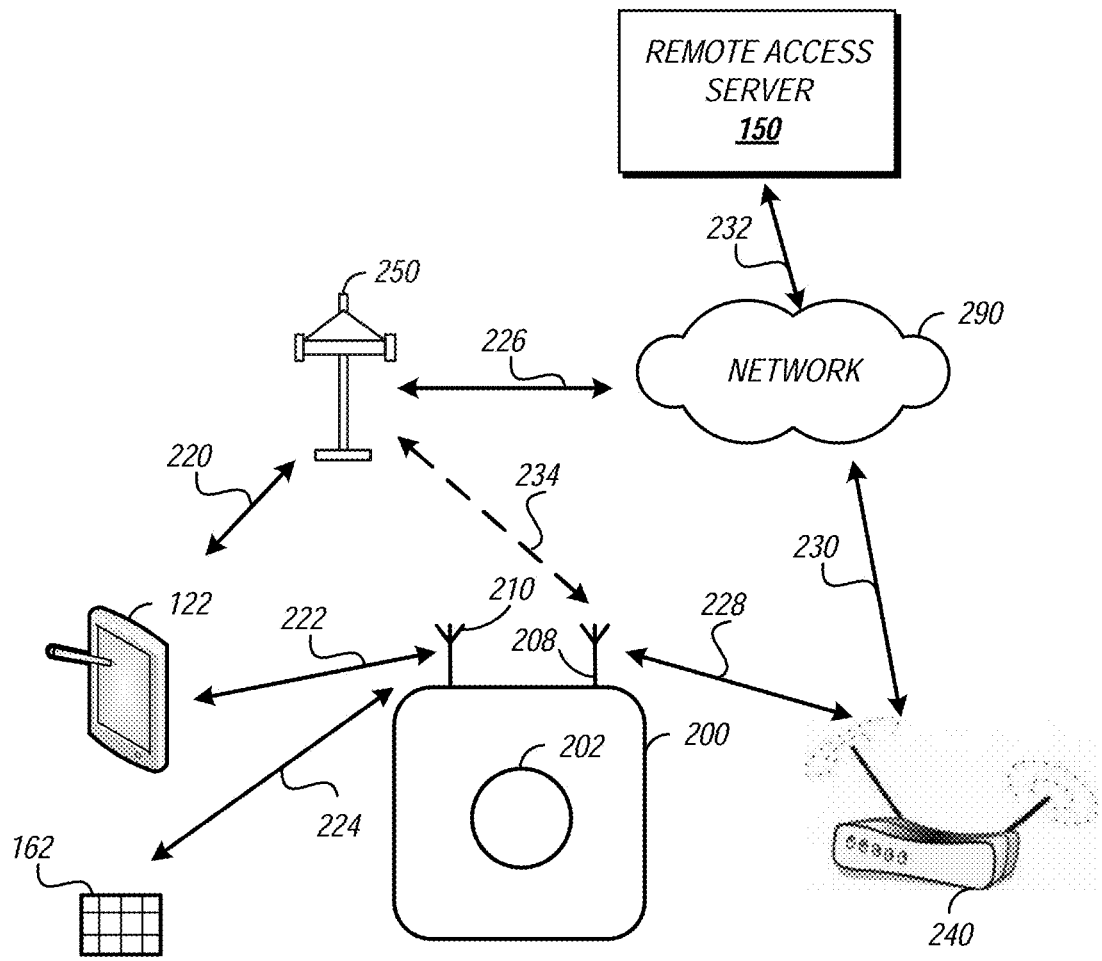
FIG. 2 is a diagram showing illustrative communication paths between devices within a remote access system.

FIG. 2 is a diagram showing illustrative communication paths between devices within a remote access system. The diagram of FIG. 2 shows communication paths between the delivery device 122, the remote access server 150, the monitoring device 200, the keyless lock controller 162, a core network 290, a base station 250, and a wireless router 240. It will be appreciated that other intermediary elements may be included. For the sake of clarity, these intermediaries have been omitted from FIG. 2 as well as the description thereof.

The delivery device 122 may communicate using at least two different communication protocols. A first protocol may be used for a first path 222 between the monitoring device 200 and the delivery device 122. The first protocol may be a personal area network protocol for transmitting messages over short distances such as 5 or 10 feet. The personal area protocol may be a BLUETOOTH® based protocol such as that defined by the BLUETOOTH® 4.0 Low Energy standard. Devices within the personal area network may transmit a discovery message to allow other, nearby devices to identify and establish a connection therewith.

A second protocol may be used for a second path 220 between the delivery device 122 and the base station 250. The base station 250 may be a wide area network base station such as a cellular or satellite network base station. In such instances, the second protocol may be a wide area network protocol for transmitting messages over long distance such as 0.5 miles, 5 miles, or 25 miles. Examples of cellular or satellite network communication protocols include code division multiple access (CDMA), wideband CDMA (WCDMA), global system for mobiles (GSM), or long-term evolution (LTE). Unlike the personal area network, the wide area network may require a device to register before transmitting or receiving messages from other devices via the wide area network. A wireless network may be associated with a service area. The service area may identify a physical space where messages can be communicated using the associated network. In general, the service area of a wide area network may be greater than the service area of a local area network. A local area network may provide a service area that is greater than the service area of a personal area network.

The base station 250 may establish a communication path 226 with the core network 290. The core network 290 may be a wide area network such as the Internet. The remote access server 150 may be attached to the core network 290 via path 232. The remote access server 150 may be assigned an address, such as an IP address, when attached to the core network 290 allowing other devices to find and exchange messages therewith.

The delivery location may include a router 240. The router 240 may be linked to the core network 290 via a path 230. The path 230 may include a wired connection from the router 240 to a service provider such as an internet service provider. Equipment of the internet service provider may complete the path 230 to the core network 290. The router 240 may provide a local area WI-FI® network. Devices located with the service range of the local area network may connect to the router 240 to obtain a connection to the core network 290. For example, the monitoring device 200 may establish a path 228 with the router 240. As shown in FIG. 2, the monitoring device 200 may communicate with the remote access server 150 using paths 228, 226, and 232.

Additional or alternate paths may be included. For example, the monitoring device 200 may include a cellular transceiver to establish a path 234 via the base station 250. This path 234 may be the primary communication path for the monitoring device 200 to the core network 290. In some implementations, this path 234 may be a backup path that can be enabled upon failure of a primary path such as the path 228.

The monitoring device 200 may also include a communication path 224 with the keyless lock controller 162. The communication path 224 may traverse a wireless local area network including machine-to-machine optimizations such as Z-WAVE® or ZIGBEE™. The communication path 224 typically services a range greater than that served by the path 222. This allows the communication path 224 to service an entire area (e.g., a home) rather than a limited portion of thereof. In some implementations, the communication path 224 may include BLUETOOTH® based technologies.

In some implementations, a communication path may be used to create a bridge. For example, if the delivery device 122 loses connectivity to the base station 250, the delivery device 122 may transmit messages to the monitoring device 220 via the path 222 for transmission to the core network 290 via the path 228 and the path 230. In such instances, the monitoring device 220 may forward all messages received from the delivery device 122 or selected messages such as those related to the access request or item being delivered. The monitoring device 220 may identify and selectively filter messages based on header information indicating a type for the message.

Figure 3:
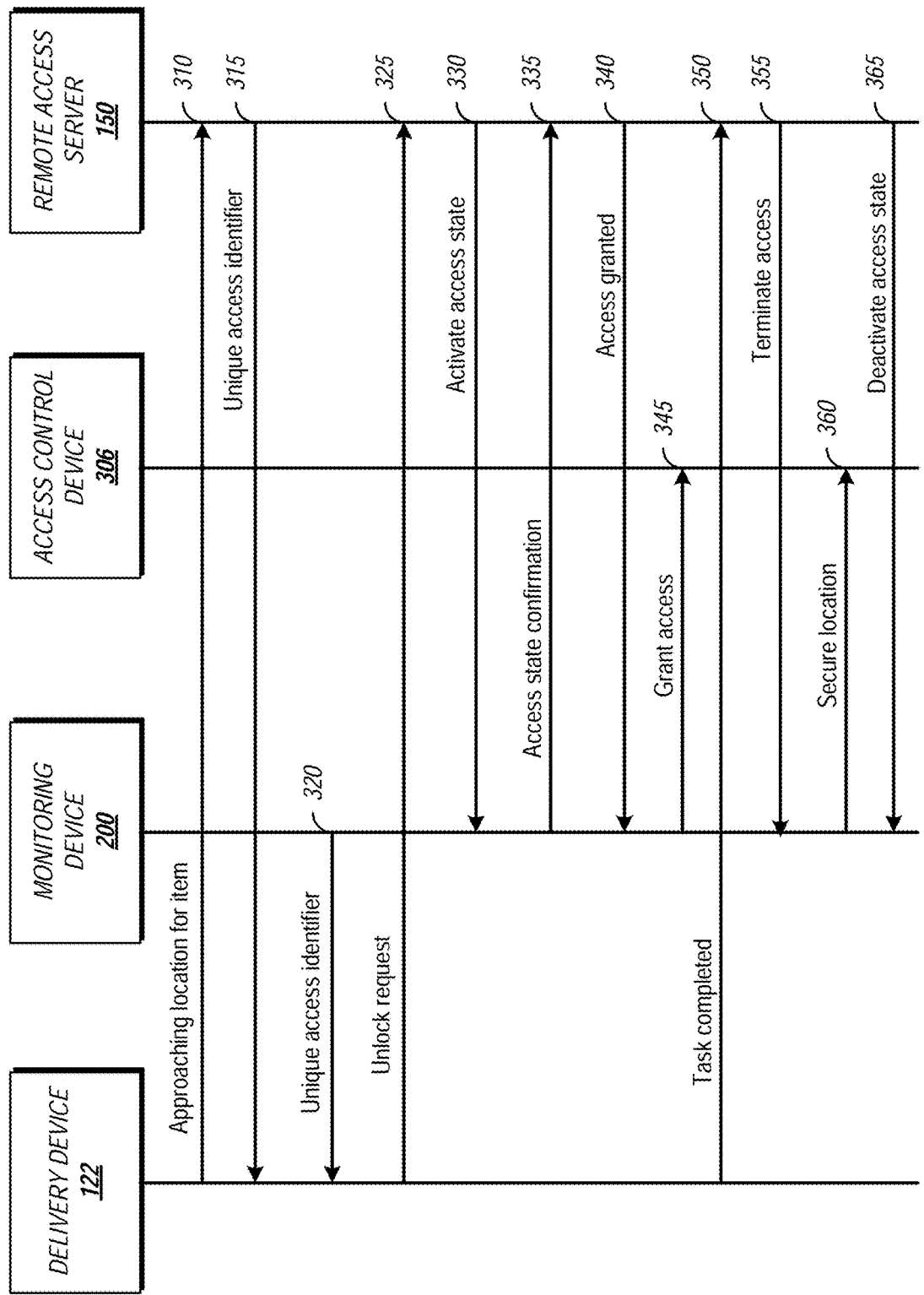
FIG. 3 is a diagram showing illustrative messaging between devices within a remote access system.

FIG. 3 is a diagram showing illustrative messaging between devices within a remote access system. The diagram of FIG. 3 shows messages between the delivery device 122, the remote access server 150, the monitoring device 200, and an access control device 306 such as the keyless lock controller 162 shown in FIGS. 1 and 2. It will be appreciated that other intermediary elements may be included. For the sake of clarity, these intermediaries have been omitted from FIG. 3 as well as the description thereof. The messages shown may be communicated using one or more of the communication paths shown in FIG. 2.

Via message 310, the delivery device 122 may transmit information indicating the delivery device 122 is approaching a delivery location for an item. The message 310 may include information scanned from the item to be delivered. The message 310 may be transmitted to the remote access server 150. In some implementations, the message 310 may be transmitted when the item is loaded for delivery (e.g., at a distribution center). For example, the item may be included on a delivery itinerary generated by a route planning system. The delivery itinerary may be provided to the delivery device 122 to guide the delivery agent to the delivery locations.

The remote access server 150 may identify the delivery location based at least in part on the message 310. For example, if the message 310 includes item identification information, the remote access server 150 may query a data store to retrieve the recipient address information. In some implementations, the message 310 may include geospatial information such as coordinates or an address of the intended delivery location.

The remote access server 150 may identify or generate a unique access identifier. The unique access identifier may be information associated with the delivery location that can be used to determine when the delivery device 122 is near or at the delivery location. In some implementations, the unique access identifier may be a device identifier for the monitoring device 200 or the access control device 306. Examples of device identifiers include media access control (MAC) address, mobile equipment identifier (MEID), international mobile equipment identity/identifier (IMEI), or electronic serial number (ESN). In some implementations, it may be desirable to have a dynamic access identifier generated that can be assigned to a device (e.g., a monitoring device) and used to validate proximity for a predetermined period of time (e.g., 10 minutes).

Via message 315, the remote access server 150 may transmit the unique access identifier to the delivery device 122. The received unique access identifier may be stored by the delivery device 122 to compare with an identifier detected at the delivery location. In implementations where the item is identified via an itinerary, the itinerary may include the unique access identifier for the delivery location and/or item to be delivered thereto.

The monitoring device 200 may transmit, via message 320, a unique access identifier. In implementations where a device identifier is used, the unique access identifier may be included in a discovery message broadcast by the monitoring device 200. In some implementations, the transmission may be caused by a control message received by the monitoring device 200 from the remote access server 150. The control signal may include the unique access identifier to transmit in the message 320.

The delivery device 122 may compare the access identifiers received via the message 315 and the message 320. If the identifiers match, then the delivery device 122 can assume it is at the appropriate delivery location. The match may cause an adjustment of an interface on the delivery device 122 to show control elements related to access control. For example, once the proximity of the delivery device 122 to the delivery location is confirmed, a control element to request access to the delivery location may be presented. When the agent is ready to make the delivery, she may activate the control element to transmit a message 325 to the remote access server 150 requesting the delivery location be unlocked. The request may include the unique access identifier for validation by the remote access server 150. The request may include a current location of the delivery device 122 for validation by the remote access server 150. The delivery device 122 may include a Global Positioning System (GPS) receiver to determine its current location.

The remote access server 150 may determine whether the delivery location is associated with any access restrictions. For example, a recipient associated with the delivery location may specify specific times for delivery or designate "do not disturb/enter" times. The preferences may be for the delivery location, for a specific item, or for time duration (e.g., on vacation). The remote access server 150 may receive access restrictions from a data store. The data store may store the access restrictions in association with an identifier for the delivery location or recipient. The remote access server 150 may identify the recipient or delivery location for an item associated with the activation request message 325 based at least in part on a value included in the message 325. If a request to unlock is received during such times or for an item associated with such times, the remote access server 150 may deny access. If the request is received at a time when the access request is allowed, the remote access server 150 may permit access, assuming all other preconditions are met.

The remote access server 150 may transmit a message 330 to the monitoring device 200 to activate the monitoring device 200 to an access state. Activating the monitoring device 200 may include transmitting a control signal to initiate recording. Activating the monitoring device 200 may include transmitting a control signal to rotate or adjust the field of monitoring of the monitoring device 200 to a door or other area where the entry will occur. The access state may be identified via a configuration stored in association with an identifier of the delivery location or recipient associated with the delivery location.

The remote access server 150 may receive a message 335 from the monitoring device 200 confirming that the access state is achieved. This ensures that the monitoring device 200 is adequately adjusted to provide a desired level of monitoring at the delivery location. The confirmation may include monitored data such as image data, video data, audio data, or the like. In some implementations, the remote access server 150 may analyze data received via the message 335. For example, the content of an image may be analyzed to ensure the recording is capturing an expected scene and has not been obstructed or is otherwise capturing an unintended view. The analysis may include color analysis of the image (e.g., is the image all black or white; average contrast; average brightness; etc.). In some implementations, the analysis may compare a series of images or frames of video. For example, the monitoring device 200 may include an illuminator that can emit different colors of light. The illuminator may be activated to emit a pattern of light that can be detected in images received by the remote access server 150. If the images are consistent with the pattern of light, then the monitoring device 200 may be properly configured. The self-testing may be performed by the monitoring device 200 alone or in concert with the remote access server 150.

Once the remote access server 150 confirms the proper monitoring state is achieved, the remote access server 150 may transmit a message 340 to the monitoring device 200 indicating that access is granted. The monitoring device 200 may, in turn, transmit a grant access message to the access control device 306. The grant access message 345 may cause a lock to unlock, a door to open, or disabling of another or additional features that secure the delivery location. FIG. 3 shows one access control device 306, but the grant access message 345 may be broadcast to multiple access control devices and used to configure the respective states to permit access to the delivery location for delivery of the item.

After the agent has delivered the item, the delivery device 122 may present a control element to indicate that the item has been delivered. Upon activation of such a control element, a task completed message 350 may be transmitted to the remote access server 150. The message 350 may include an identifier for the delivery device 122, the item, or the delivery location. The remote access server 150 may use the identifier to find the monitoring device 200 at the delivery location. If the identifier for the delivery device 122 is provided in the message 350, the remote access server 150 may compare the identifier with information received in the unlock request (e.g., message 325). If the item identifier is provided in the message 350, the delivery location may be identified based on the item identifier. The monitoring device 200 may be associated with the delivery location and thus identified.

Having identified the monitoring device 200, the remote access server 150 may transmit a message 355 to terminate access to the delivery location. The terminate access message may cause the monitoring device 200 to transmit a message 360 to the access control device 306 to secure the delivery location. For example, if the access control device 306 is a keyless lock controller, the message 360 may cause the controller to re-engage the lock. Confirmation messages (not shown) may be transmitted by the access control device 306 or the monitoring device 200 to indicate that the delivery location has been secured.

Once the remote access server 150 confirms the delivery location has been secured, a deactivate access state message 365 may be transmitted to the monitoring device 200. The message 365 may cause the monitoring device 200 to terminate collection of data (e.g., video recording) at the delivery location.

The monitoring device 200 is discussed as both a sensor (e.g., camera) and a communications coordination device for exchanging messages between, for example, the access control device 306 and the remote access server 150. In some implementations, these functionalities may be separated into distinct devices. For example, a monitoring hub may be included at the delivery location and configured to coordinate messaging between the remote access server 150 and a variety of devices at the delivery location such as one or more sensors or one or more access control devices. In some implementations, the communications functions may be provided by a device coupled to the monitoring device 200. For example, a Z-WAVE® adapter may be connected to a peripheral port (e.g., Universal Serial Bus port) of the monitoring device 200. The peripheral port may provide data and power connectivity for the communication adapter (e.g., Z-WAVE® adapter).

Figure 4:
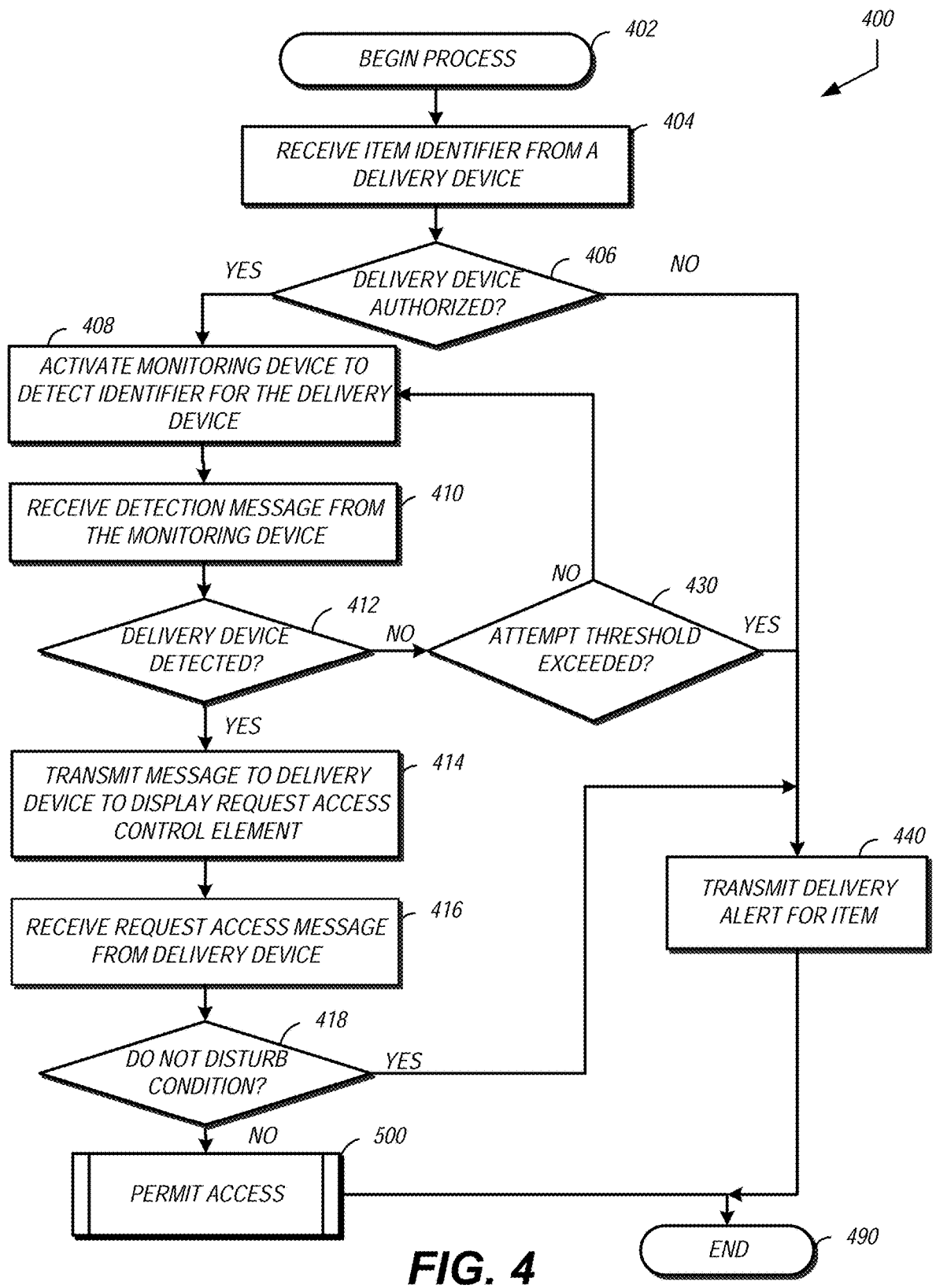
FIG. 4 is a flow diagram depicting an example method of remote access authentication and authorization.

FIG. 4 is a flow diagram depicting an example method of remote access authentication and authorization. The method 400 may be implemented in whole or in part by the devices described such as the remote access server 150 or the delivery device 122. The method 400 illustrates how a delivery device can be authenticated and authorized to access a delivery location to deliver an item.

The method 400 may begin at block 402 with the assumption that an item is en route for delivery to a location. At block 404, the remote access server 150 may receive an item identifier from the delivery device 122. The item identifier may be scanned by the delivery device 122. The delivery agent 120 may have provided user credentials to access the delivery device 122. An identifier for the delivery agent may be included in a message with the item identifier. In some implementations, the item identifier may be associated with a parcel containing multiple items. The receiving at block 404 may be via a wide area network.

At block 406, the remote access server 150 may determine whether the delivery device 122 is authorized to deliver the item associated with the item identifier. The determination may include confirming the credentials of the delivery agent 120 or authenticity of the delivery device 122. The confirming may include comparing a security token, shared secret, or other identifying information to confirm that the delivery agent 120 and delivery device 122 are permitted access to the remote access server 150. The determination at block 406 may include retrieving order information for the item such as from an order management system. The order information may identify a recipient location for the item. If the recipient location does not correspond to the current location of the delivery device 122, the authorization determination at block 406 may be negative. In some implementations, the determination may include retrieving routing information for the delivery device 122 such as from a route planning server. The routing information may identify a series of locations where deliveries will be made. If the routing information does not include an entry associated with the item identifier, the determination at block 406 may be negative.

If the determination at block 406 is negative, the method 400 may proceed to block 440. At block 440, the remote access server 150 may transmit a delivery alert for the item. Transmitting a delivery alert may include notifying the shipper of the item. For example, a delivery alert indicating that the item was placed on the wrong delivery vehicle may be transmitted to a route planning server. A delivery alert may be transmitted to the delivery device 122. For example, if the item was given to the delivery agent 120 in error, the alert may cause the interface of the delivery device 122 to present a message indicating that delivery of the item should be skipped and the agent may proceed to scan another item for delivery. A delivery alert may be transmitted to the recipient. In some instances, the authorization may fail due to a malicious attempt to impersonate a delivery agent or delivery device. In such instances, it may be desirable to transmit an alert to the recipient to heighten awareness for suspicious persons or items. The transmission may be via a wide area network such as a cellular network, satellite network, or the Internet. Once transmitted, the method 400 may end at block 490.

Returning to block 406, if the delivery device 122 is authorized, at block 408, the remote access server 150 may activate a monitoring device at the delivery location to detect an identifier for the delivery device. Activation at block 408 may include transmitting a control message via a wide area network to the monitoring device 200. In FIG. 3, the messaging illustrated how the delivery device 122 may detect an identifier for the monitoring device 200. In the method 400 shown in FIG. 4, an alternate approach is shown whereby the monitoring device detects the identifier of the delivery device 122. The activation at block 408 may include a control message to enable a transceiver on the monitoring device such as a low energy BLUETOOTH® 4.0 standard based transceiver. The activation may include the expected identifier of the delivery device 122. In some implementations, the activation at block 408 may be omitted and the control message may be continuously transmitted according to a schedule (e.g., every 30 seconds, every minute, etc.).

At block 410, the remote access server 150 may receive a detection message from the monitoring device 200. The detection message may indicate receipt of the identifier for the delivery device 122. In some implementations, the detection message may include additional information about the delivery device 122 such as a security code or other information to confirm the identity of the delivery device 122 such as a media access control (MAC) address, a mobile equipment identifier (MEID), an international mobile equipment identity/identifier (IMEI), or an electronic serial number (ESN).

At block 412, the remote access server 150 may determine whether the delivery device has been positively detected. The determination at block 150 may include analyzing the detection message. For example, if the MAC address of the delivery device is provided, the remote access server 150 may compare a registry of MAC addresses for authorized delivery devices with the received MAC address. If the received MAC address is included, then the positive detection may be confirmed. In some implementations, the confirmation may include comparing a current location of the delivery device 122 with the location of the monitoring device 200. For example, the delivery device 122 may register with a cellular network. The cellular network may use triangulate to identify a location for the delivery device 122. The delivery device 122 may include positioning hardware such as a GPS receiver which may alternatively or additionally provide a location for the delivery device 122.

The location of the delivery device 122 may be compared to the location of the monitoring device 200. If the locations correspond, then the detection may be confirmed. The correspondence of the locations may be based on a threshold distance between the two locations.

The determination at block 412 may be negative if the delivery device 122 has not yet come close enough to the monitoring device 200 to transmit the identifier. For example, the delivery device 122 may transmit the identifier at a range of 5 or 10 feet. If the delivery device 122 has not been detected, it may still be outside the limited range. This may be desirable to ensure the identification is confirmed when the delivery device 122 is proximate to the delivery location. Another reason the detection at block 412 may fail is because the incorrect identifier for the delivery location is presented.

To allow the method 400 to account for delay or random error, at block 430 the remote access server 150 may determine whether an attempt threshold has been exceeded. The threshold may be based on the number of detection messages received. The threshold may be based on time. For example, if an elapsed time from an access request exceeds an attempt time threshold, it may be determined that a delivery error or failure may have occurred. If the determination at block 430 is negative, the method 400 may allow further access attempts by returning to block 408. If the determination at block 430 is affirmative, the number of attempts or excessive delay may indicate an error in the delivery. In such instances, the method 400 may proceed to block 440 to transmit a delivery alert as discussed herein.

Returning to block 412, if the remote access server 150 determines the delivery device 122 is proximately located to the monitoring device 200, the remote access server 150 may transmit a message to the delivery device 122 to display a request access control element on an interface. The request access control element may be a button or swipe control that, when activated, causes the delivery device 122 to transmit a request access message to the remote access server 150. The request access message may include a security token, shared secret, or other identifying information to confirm the identity of the delivery agent 120 and delivery device 122. This can ensure that the delivery agent 120 is authorized and in a position to make the delivery once access to the delivery location is granted.

At block 416, the remote access server 150 may receive the request access message from the delivery device 122. The request access message may include an identifier for one or more of the delivery device 122, the item, or the delivery location. The remote access server 150 may use this information to retrieve do not disturb preferences. The do not disturb preferences may be established based on the item. For example, if a recipient at a delivery location does not wish to allow unattended delivery of perishable items, the recipient may indicate a do not disturb preference for items of type perishable. As another example, the recipient may wish to deny access during specific times such as during evening hours. The recipient may establish access control permissions including a time period during which remote access requests will be denied even if the delivery device 122 is properly authenticated. The access control permissions may be stored in a memory or other data store accessible by the remote access server 150. An access control permission may be associated with the delivery location or an identifier therefor.

If the determination at block 418 is affirmative and a do not disturb condition is applicable, the method 400 may proceed to block 440 to transmit a delivery alert for the item. The delivery alert may indicate that do not disturb conditions have been applied. In some implementations, the alert may include alternate delivery instructions for the delivery agent (e.g., return to depot; leave with neighbor) or the recipient (e.g., pick up at depot; will retry at a later date).

If the determination at block 418 is negative, do not disturb conditions may not be applicable and remote access may be granted. At block 500, the method 400 may permit access to the delivery location.

Figure 5:
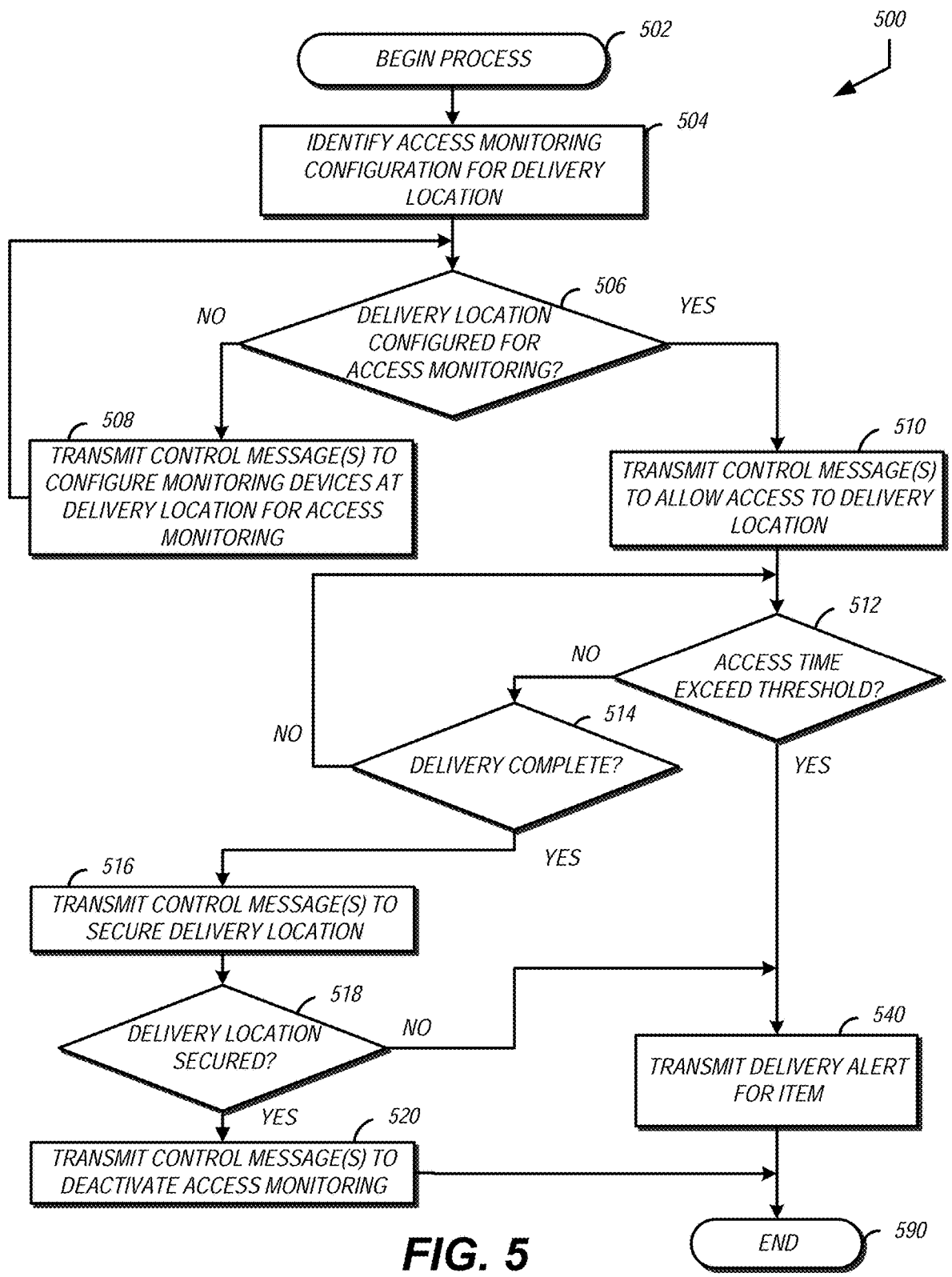
FIG. 5 is a flow diagram depicting an example method of permitting access to a delivery location based at least in part on monitoring status.

FIG. 5 is a flow diagram depicting an example method of permitting access to a delivery location based at least in part on monitoring status. The method 500 may be implemented in whole or in part by the devices described such as the remote access server 150 or the delivery device 122. The method 500 illustrates how the status of the monitoring devices at a location can be used to determine whether to permit access to an authorized delivery device.

The method 500 may begin at block 502 with the assumption that an item is proximately located to the delivery location and the delivery agent is authorized to deliver. To further ensure the security of the delivery, it may be desirable to ensure that a desired level of monitoring is activated before allowing entry to the delivery location.

At block 504, the remote access server 150 may identify an access monitoring configuration for the delivery location. Because each delivery location may include different monitoring devices, it may be desirable to identify which devices are available for a delivery location. The monitoring configuration may identify which devices and at what configuration to monitor the delivery location during unattended access. The recipient associated with the delivery location may provide a custom access monitoring configuration to allow monitoring of the delivery location at a specified level. For example, the access monitoring configuration may identify a camera installed near a door for access monitoring. The access monitoring configuration may include specific activation settings. For example, the camera may include an illuminator and the access monitoring configuration may specify a level of illumination to activate for the camera. The access monitoring configuration may be stored in association with an identifier for the delivery location.

At block 506, the remote access server 150 may determine whether the delivery location is configured for the specified access monitoring. The determination may include confirming communication channels with the specified devices performing the monitoring. The determination at block 506 may include testing the monitoring devices such as capturing sample monitoring data to confirm desired operation.

The determination at block 506 may be based on a comparison between a response message received from one or more of the devices performing the monitoring and the access monitoring configuration. The comparison may include verifying a status value for a monitoring device indicates a particular monitoring state (e.g., recording, ready to record, battery level, orientation, field of view, etc.) specified by the access monitoring configuration. In some implementations, the determination at block 506 may include comparing monitoring data (e.g., images, video, audio) or capture information related to the monitoring data (e.g., frame rate, color profile, brightness, object recognition, etc. metric derived therefrom such as an average or moving average over time) with reference values identified using the access monitoring configuration. For example, to permit access to a delivery location, the access monitoring configuration may indicate that video captured at no less than 40 frames per second must be received. If the video data received is less than the specified threshold, the determination at block 506 may be negative. As another example, the access monitoring configuration may identify a reference image of the delivery location. The reference image may be show a scene at the delivery location that the user wishes to capture during unattended access. The reference image may be compared to an image included in the monitoring data prior to permitting access to the delivery location. If the scene shown in the image corresponds to the scene shown in the reference image, the determination at block 506 may be affirmative. Correspondence between images may include comparing color histograms, locations of objects detected within the images, comparison of binary masked versions of the images, or other image comparison techniques. Correspondence may identify differences or a degree of difference between the reference image and the monitored image. The number of differences or degree of difference may be compared to a correspondence threshold. The determination at block 506 may be based on the comparison with the correspondence threshold.

If the determination at block 506 is negative, the method 500 may proceed to block 508 to transmit one or more control messages to configure the monitoring devices identified in the access monitoring configuration for access monitoring. The control messages may cause the devices to change power states (e.g., wake up from a sleep mode), adjust monitoring area (e.g., activate a servo to rotate, pan, or zoom), perform a self-test, initiate collection of monitoring data (e.g., start recording), or other adjustment. In some implementations, the control message may be transmitted via a wide area network to a monitoring hub at the delivery location. The monitoring hub may then distribute the control signals to respective devices at the delivery location using a local area network or personal area network.

The monitoring hub or monitoring device identified by the one or more control messages may provide a control message response. The control message response may acknowledge receipt of a control message. The control message response may include a status indicator for the monitoring device. For example, if the monitoring device is a camera, the control message response may include information indicating that recording has been initiated.

Returning to block 506, if the delivery location is configured for access monitoring, at block 510, the remote access server 510 may transmit a control message to allow access to the delivery location. The control message may be transmitted via a wide area network to a monitoring device. The monitoring device may then transmit an unlock message or release message via a local area network to one or more devices to allow entry to the delivery location. In some implementations, the unlock message may be transmitted to a keyless lock controller or other security device. In some implementations, the unlock message may be transmitted to an automatic door opener. In such implementations, the unlock message may include a distance to open the door. For example, if the item being delivered is a book, the door may only need to be opened a small amount to receive the item. To further enhance security of the delivery, the door may only be opened by an amount needed to receive the item. The amount may be determined by the remote access server 150 and included in the control message.

Because the remote access server 150 may not be actively monitoring the delivery location once access has been granted, the remote access server 150 may initiate a timer or otherwise record time to determine how long the delivery location has been unlocked. At block 512, the remote access server 150 may determine whether the time that the delivery location has been unlocked exceeds a threshold. The threshold may be between one and five minutes. If the threshold has not been exceeded, the method 500 may proceed to block 514. At block 514, a determination may be made as to whether the delivery is complete. The determination at block 514 may be based on receipt of a message from the delivery device 122 indicating the delivery was completed. In some implementations the message may include receiving an identifier for a new item for delivery from the delivery device 122. In some implementations, it may be desirable to receive an affirmative request to secure the location from the delivery device 122. For example, the delivery device 122 may present an interface including a control element that, when activated, transmit the message indicating delivery of the item is complete.

If the determination at block 514 is negative, the method 500 may return to block 512 as described above. If the threshold at block 512 is exceeded, the method 500 may proceed to block 540. At block 540, the remote access server 150 may transmit a delivery alert similar for the item. The transmission at block 540 may be similar to that described with reference to block 440 in FIG. 4. In some implementations, the alert may include one or more control messages to secure the delivery location. For example, a control message to close a door and/or secure a lock may be transmitted to secure the delivery location as described herein.

Returning to block 514, if the remote access server 150 determines that the delivery is complete, it may be desirable to secure the delivery location. At block 516, the remote access server 150 may transmit one or more control messages to secure the delivery location. The messages may include transmitting a message to the monitoring device via a wide area network. The monitoring device may in turn transmit a message via a local area network to one or more devices to secure the delivery location. The message may include a request to close a door, enable a lock, or the like.

At block 518, the remote access server 150 may confirm that the delivery location is secured. The confirmation may include receiving an acknowledgement from a monitoring device at the delivery location. The confirmation may include transmitting a request for status to one or more of the devices at the delivery location and receiving a status response. The response or acknowledgment may include information indicating that the device is secured. If the devices associated with the delivery location report a secured state, the determination at block 518 may be affirmative.

Having secured the location, the monitoring of the delivery location may then be adjusted to the pre-delivery configuration. At block 520, the remote access server 150 may transmit one or more control messages to the monitoring devices that were activated to monitor the delivery. The one or more control messages may change the monitoring state of the monitoring devices (e.g., stop recording; turn on motion activated monitoring). A control message may be transmitted via a wide area network to a specific monitoring device to be adjusted. In some implementations, the control message may be transmitted to one monitoring device for further dissemination via the local area network at the delivery location. The method 500 may end at block 590. The method 500 ensures that monitoring is activated while the delivery location is unsecured. A failure in monitoring may cause the access to be denied or transmission of a delivery alert to quickly identify a potential problem.

Figure 6:
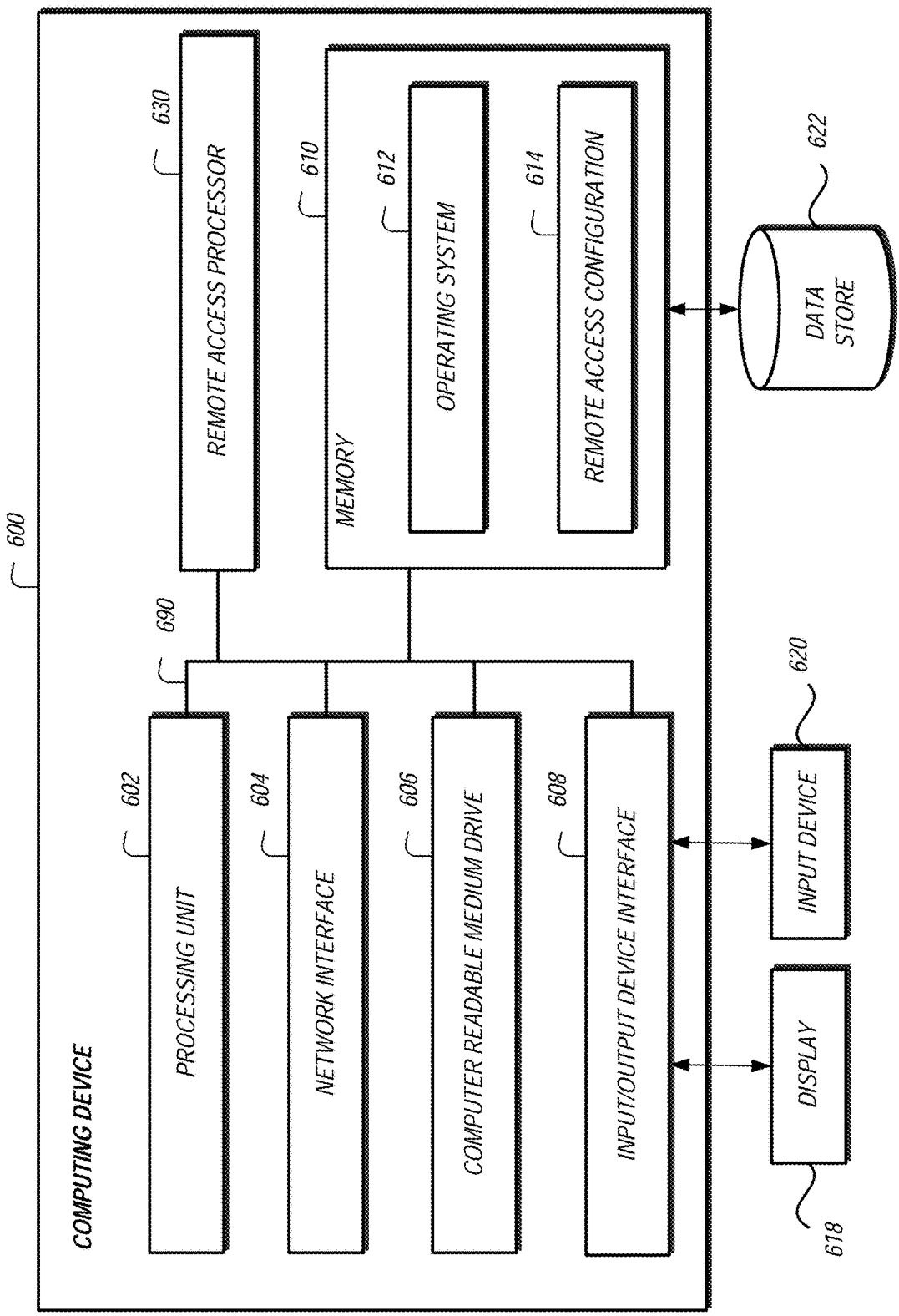
FIG. 6 is a block diagram of an illustrative computing device that may implement one or more of the access control features described.

FIG. 6 is a block diagram of an illustrative computing device that may implement one or more of the access control features described. The computing device 600 may implement the methods or messaging shown in of FIG. 3, 4, or 5. The computing device 600 can be a server or other computing device, and can comprise a processing unit 602, a remote access processor 630, a network interface 604, a computer readable medium drive 606, an input/output device interface 608, and a memory 610. The network interface 604 can provide connectivity to one or more networks or computing systems. The processing unit 602 can receive information and instructions from other computing systems or services via the network interface 604. The network interface 604 can also store data directly to memory 610. The processing unit 602 can communicate to and from memory 610 and output information to an optional display 618 via the input/output device interface 608. The input/output device interface 608 can also accept input from the optional input device 620, such as a keyboard, mouse, digital pen, microphone, mass storage device, etc.

The memory 610 contains computer program instructions that the processing unit 602 executes in order to implement one or more embodiments. The memory 610 may include RAM, ROM, and/or other persistent, non-transitory computer readable media. The memory 610 can store an operating system 612 that provides computer program instructions for use by the processing unit 602 or other elements included in the computing device in the general administration and operation of the computing device 600. The memory 610 can further include computer program instructions and other information for implementing aspects of the present disclosure.

For example, in one embodiment, the memory 610 includes a remote access configuration 614. The remote access configuration 614 may include the thresholds, authentication information (e.g., encryption keys, tokens, device identifiers etc.), or other predetermined or configurable values described herein. The remote access configuration 614 may store specific values for a given configuration. The remote access configuration 614 may, in some implementations, store information for obtaining values for a given configuration element. For example, a delivery device authentication service may be specified as a network location (e.g., URL) in conjunction with username and password information to access the network location to obtain or verify a delivery device or property thereof (e.g., location, associated delivery agent, route, or delivery manifest). The remote access configuration 614 may be used by the remote access processor 630 to implement one or more of the aspects described herein. In some implementations, the remote access processor 630 may include specific computer executable instructions that cause the computing device 600 to perform one or more of the remote access control features described.

The memory 610 may also include or communicate with one or more auxiliary data stores, such as data store 622. The data store 622 may electronically store data regarding the item, the delivery agent, the delivery device, the delivery location, monitoring devices, access control configurations for locations or devices, do not disturb rules, and the like.

The elements included in the computing device 600 may be coupled by a bus 690. The bus 690 may be a data bus, communication bus, or other bus mechanism to enable the various components of the computing device 600 to exchange information.

In some embodiments, the computing device 600 may include additional or fewer components than are shown in FIG. 6. For example, a computing device 600 may include more than one processing unit 602 and computer readable medium drive 606. In another example, the computing device 602 may not be coupled to the display 618 or the input device 620. In some embodiments, two or more computing devices 600 may together form a computer system for executing features of the present disclosure.

In one example implementation of the features described, a user may install a smart lock or other keyless access control device on a door to her home or other delivery location and place a smart camera or other remote controlled monitoring device inside the delivery location facing the door. The user may request delivery an item using in-home delivery. When the delivery agent arrives at the door at the delivery location, the agent may first knock or ring the doorbell. If there is no answer, the agent may use a delivery device to scan the item and a delivery application executing on the delivery device may transmit a request via a cellular network to request the door to be unlocked. The system may verify that the correct driver is at the door and transmit one or more control messages to turn on the smart camera, unlock the door, and record the item being placed inside and the door being shut. A notification confirming the delivery, including, in some implementations, the video, may be transmitted to the user. The user can choose a service time window at checkout and the system may grant access to the service provider during that time. In such implementations, the user may control the terms of unattended delivery. In some implementations, the user may transmit a message to the access server to deny all access requests for the delivery location.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as specialized hardware, or as specific software instructions executable by one or more hardware devices, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A delivery access device (e.g. remote access server or delivery device) can be or include a microprocessor, but in the alternative, the delivery access device can be or include a controller, microcontroller, or state machine, combinations of the same, or the like configured to authenticate and authorize remote access for delivery of an item. A delivery access device can include electrical circuitry configured to process computer-executable instructions. Although described herein primarily with respect to digital technology, a delivery access device may also include primarily analog components. For example, some or all of the access control algorithms or interfaces described herein may be implemented in analog circuitry or mixed analog and digital circuitry. A computing environment can include a specialized computer system based on a microprocessor, a mainframe computer, a digital signal processor, a portable computing device, a device controller, or a computational engine within an appliance, to name a few.

The elements of a method, process, routine, interface, or algorithm described in connection with the embodiments disclosed herein can be embodied directly in specifically tailored hardware, in a specialized software module executed by a delivery access device, or in a combination of the two. A software module can reside in random access memory (RAM) memory, flash memory, read only memory (ROM), erasable programmable read-only memory (EPROM), electrically erasable programmable read-only memory (EEPROM), registers, hard disk, a removable disk, a compact disc read-only memory (CD-ROM), or other form of a non-transitory computer-readable storage medium. An illustrative storage medium can be coupled to the delivery access device such that the delivery access device can read information from, and write information to, the storage medium. In the alternative, the storage medium can be integral to the delivery access device. The delivery access device and the storage medium can reside in an application specific integrated circuit (ASIC). The ASIC can reside in an access device or other delivery access device. In the alternative, the delivery access device and the storage medium can reside as discrete components in an access device or electronic communication device. In some implementations, the method may be a computer-implemented method performed under the control of a computing device, such as an access device or electronic communication device, executing specific computer-executable instructions.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each is present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein a "user interface" (also referred to as an interactive user interface, a graphical user interface, an interface, or a UI) may refer to a network based interface including data fields and/or other controls for receiving input signals or providing electronic information and/or for providing information to the user in response to any received input signals. A UI may be implemented in whole or in part using technologies such as hyper-text mark-up language (HTML), ADOBE® FLASH®, JAVA®, MICROSOFT® .NET®, web services, and rich site summary (RSS). In some implementations, a UI may be included in a stand-alone client (for example, thick client, fat client) configured to communicate (e.g., send or receive data) in accordance with one or more of the aspects described.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes that come within the meaning and range of equivalency of the claims are to be embraced within their scope.

What is claimed is:

1. A computer-implemented method of controlling access to a delivery location, the computer-implemented method comprising:
   under control of one or more computing devices executing specific computer-executable instructions,
      receiving a user input identifying a monitoring configuration for monitoring the delivery location equipped with a monitoring device and an access control device, wherein the monitoring configuration identifies:
         the monitoring device, and
         a recording parameter for the monitoring device;
      receiving, from a delivery device, a request to access the delivery location including an identifier for the delivery location;
      identifying the monitoring configuration based at least in part on the identifier for the delivery location;
      in response to receiving the request, transmitting a monitoring control message to the monitoring device, wherein the monitoring control message includes:
         the monitoring configuration, and
         a request to initiate monitoring according to the monitoring configuration;
      receiving, from the monitoring device, a monitoring control message response including at least one of:
         (i) an acknowledgement of monitoring, or
         (ii) monitoring data;
      determining that the monitoring control message response satisfies the monitoring configuration;
      based at least in part on determining that the monitoring control message response satisfies the monitoring configuration, confirming the monitoring device is monitoring the delivery location according to the monitoring configuration; and
      based at least in part on confirming the monitoring device is monitoring the delivery location according to the monitoring configuration, transmitting, to the monitoring device, an access control message indicating that the access control device is authorized to provide access to the delivery location, wherein in response to receiving the access control message, the monitoring device transmits an access command to the access control device.

2. The computer-implemented method of claim 1, further comprising:
   storing, in a memory, an access control permission identifying a period of time to grant access to the delivery location;
   retrieving, from the memory, the access control permission for the delivery location based at least in part on the request; and
   determining that the request to access the delivery location corresponds to the period of time.

3. The computer-implemented method of claim 1, further comprising:
   determining that an elapsed time from transmission of the access control message to the monitoring device exceeds a threshold and that no further requests to access the delivery location were received; and
   transmitting an alert to at least one of: a user device associated with the delivery location or the delivery device indicating a possible access failure.

4. The computer-implemented method of claim 1, wherein determining that the monitoring control message response satisfies the monitoring configuration comprises at least one of:
   (i) determining an acknowledgment code included in the monitoring control message response corresponds to a monitoring state for the monitoring device identified in the monitoring configuration;
   or
   (ii) determining that a frame rate of the monitoring data satisfies a frame rate identified by the monitoring configuration.

5. The computer-implemented method of claim 1, wherein:
   the recording parameter is a first recording parameter for the monitoring device; and
   the monitoring device is configured to monitor the delivery location according to a second recording parameter.

6. A computer-implemented method of controlling access to a delivery location, the computer-implemented method comprising:
   under control of one or more computing devices executing specific computer-executable instructions,
      receiving a user input identifying a monitoring configuration for monitoring the delivery location at which a monitoring device and an access control device are present, wherein the monitoring configuration identifies:
         the monitoring device, and
         a monitoring parameter for the monitoring device;
      receiving, from a portable communication device, a request to access the delivery location including information identifying the delivery location;

in response to receiving the request, transmitting a monitoring control message to the monitoring device, wherein the monitoring control message includes:
  the monitoring configuration, and
  a request to initiate collection of monitoring data according to the monitoring configuration; receiving, from the monitoring device, monitoring data;
determining that the monitoring data satisfies the monitoring configuration; and
transmitting, to the monitoring device, a first access control message indicating that the monitoring device is authorized to provide access, via the access control device, to the delivery location, wherein in response to receiving the first access control message, the monitoring device transmits a first access command to the access control device.

7. The computer-implemented method of claim 6, wherein the access control device comprises a lock, and wherein the lock is released in response to the first access command.

8. The computer-implemented method of claim 6, wherein the monitoring data comprises image data, and wherein determining that the monitoring data satisfies the monitoring configuration comprises:
  retrieving a reference image identified in the monitoring configuration for the delivery location;
  identifying differences between the reference image and the image data; and
  determining that the differences are below a difference threshold.

9. The computer-implemented method of claim 6, wherein the monitoring data comprises image data, and wherein the computer-implemented method further comprises:
  generating an image metric for the image data, the image metric identifying at least one of an average brightness or an average color of pixels included in the image data; and
  determining the image metric corresponds to an image quality threshold.

10. The computer-implemented method of claim 6, further comprising:
  storing, in a memory, an access control permission identifying a period of time to grant access to the delivery location;
  retrieving, from the memory, the access control permission for the delivery location based at least in part on the request; and
  determining that the request to access the delivery location corresponds to the period of time.

11. The computer-implemented method of claim 6, further comprising:
  determining that an elapsed time from transmission of the first access control message to the monitoring device exceeds a threshold and that no requests to access the delivery location were received after transmitting the first access control message to the monitoring device; and
  transmitting an alert to at least one of: a user device associated with the delivery location or the portable communication device indicating a possible access failure.

12. The computer-implemented method of claim 6, wherein the monitoring device comprises a camera, wherein the monitoring data comprises video data captured by the camera.

13. The computer-implemented method of claim 6, further comprising:
  receiving, from the portable communication device, a message indicating that the portable communication device has exited the delivery location;
  transmitting, to the monitoring device, a second access control message indicating that the monitoring device is authorized to secure, via the access control device, the delivery location, wherein in response to receiving the second access control message, the monitoring device transmits a second access command to the access control device;
  receiving, from the monitoring device, a confirmation message indicating that the delivery location is secured; and
  transmitting a terminating control message to the monitoring device to terminate collection of the monitoring data.

14. The computer-implemented method of claim 6, wherein:
  the monitoring parameter is a first monitoring parameter for the monitoring device;
  prior to receiving the monitoring control message, the monitoring device is configured to collect monitoring data based at least in part on a second monitoring parameter; and
  after receiving the monitoring control message, the monitoring device is configured to collect monitoring data based at least in part on the first monitoring parameter.

15. The computer-implemented method of claim 6, wherein the monitoring device comprises at least one of a data collection device or a sensor.

16. The computer-implemented method of claim 6, wherein the monitoring parameter comprises at least one of an illumination level, a field of view, or an orientation.

17. A system for controlling access to a delivery location, the system comprising:
  a computer-readable memory storing computer-executable instructions, and
  one or more computer processors in communication with the computer-readable memory, wherein the one or more computer processors are configured to execute the computer-executable instructions to at least:
    store, in a data store, a monitoring configuration for monitoring the delivery location at which a monitoring device and an access control device are present, wherein the monitoring configuration identifies:
      the monitoring device, and
      an updated monitoring parameter for the monitoring device;
    receive, from a portable communication device, a request to access the delivery location including information identifying the delivery location;
    in response to receiving the request, transmit a monitoring control message to the monitoring device, wherein the monitoring control message includes:
      the monitoring configuration, and
      a request to initiate collection of monitoring data according to the monitoring configuration;
    receive, from the monitoring device, monitoring data;
    determine that the monitoring data satisfies the monitoring configuration; and
    transmit, to the monitoring device, a first access control message indicating that the monitoring device is authorized to provide access, via the access control device, to the delivery location, wherein in response to receiving the first access control message, the monitoring device transmits a first access command to the access control device.

18. The system of claim 17,
wherein the monitoring data comprises image data, and
wherein to determine that the monitoring data satisfies the monitoring configuration, the one or more computer processors are configured to execute further computer-executable instructions to at least:
retrieve a reference image identified in the monitoring configuration for the delivery location;
identify differences between the reference image and the image data; and
determine that the differences are below a difference threshold.

19. The system of claim 17,
wherein the monitoring data comprises image data, and
wherein the one or more computer processors are configured to execute further computer-executable instructions to at least:
generate an image metric for the image data, the image metric identifying at least one of an average brightness or an average color of pixels included in the image data; and
determine the image metric corresponds to an image quality threshold.

20. The system of claim 17, wherein the one or more computer processors are configured to execute further computer-executable instructions to at least:
store, in the data store, an access control permission identifying a period of time to grant access to the delivery location;
retrieve, from the data store, the access control permission for the delivery location based at least in part on the request; and
determine that the request to access the delivery location corresponds to the period of time.

21. The system of claim 17, wherein the one or more computer processors are configured to execute further computer-executable instructions to at least:
determine that an elapsed time from transmission of the first access control message to the monitoring device exceeds a threshold and that no requests to access the delivery location were received after transmitting the first access control message to the monitoring device; and
transmit an alert to at least one of: a user device associated with the delivery location or the portable communication device indicating a possible access failure.

22. The system of claim 17, wherein the one or more computer processors are configured to execute further computer-executable instructions to at least:
receive, from the portable communication device, a message indicating that the portable communication device has exited the delivery location;
transmitting, to the monitoring device, a second access control message indicating that the monitoring device is authorized to secure, via the access control device, the delivery location, wherein in response to receiving the second access control message, the monitoring device transmits a second access command to the access control device;
receive, from the monitoring device, a confirmation message indicating that the delivery location is secured; and
transmit a disable control message to the monitoring device to disable collection of the monitoring data.

23. The system of claim 17, wherein the updated monitoring parameter identified in the monitoring configuration comprises an updated monitoring parameter that is different than a prior monitoring parameter for the monitoring device for the delivery location.

* * * * *